(12) United States Patent
Tsubono

(10) Patent No.: US 8,553,116 B2
(45) Date of Patent: Oct. 8, 2013

(54) DIGITAL CAMERA AND EXPOSURE CONTROL METHOD

(75) Inventor: Eiji Tsubono, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 99 days.

(21) Appl. No.: 13/413,060

(22) Filed: Mar. 6, 2012

(65) Prior Publication Data
US 2012/0229697 A1    Sep. 13, 2012

(30) Foreign Application Priority Data

Mar. 7, 2011  (JP) .................. 2011-048739
Mar. 9, 2011  (JP) .................. 2011-051445

(51) Int. Cl.
*H04N 3/14*    (2006.01)
*H04N 5/335*   (2011.01)

(52) U.S. Cl.
USPC ............................. 348/296; 348/297

(58) Field of Classification Search
USPC ............................................ 348/296
See application file for complete search history.

(56) References Cited

U.S. PATENT DOCUMENTS

| 5,471,242 A | 11/1995 | Kondo | |
| 6,542,194 B1* | 4/2003 | Juen | 348/367 |
| 7,907,206 B2 | 3/2011 | Toyoda | |
| 7,911,502 B2* | 3/2011 | Suzuki | 348/222.1 |

FOREIGN PATENT DOCUMENTS

| JP | 05-260392 | 10/1993 |
| JP | 11-041523 | 2/1999 |
| JP | 11-234574 | 8/1999 |
| JP | 2001-235779 | 8/2001 |
| JP | 2006-166417 | 6/2006 |

* cited by examiner

*Primary Examiner* — Anthony J Daniels (57) ABSTRACT

Shutter blades are driven so that light which hits an image sensor which has been hit by the light is blocked (timing t5). That the shutter blades have moved a predetermined amount is detected before the start of the shutter blades blocking the light (timing t6), and furthermore, reset scanning of the exposure amount of the image sensor vertically upwards is started at a reset timing according to the detection before the start of the shutter blades blocking the light (timing t7). Due to this, it is possible for the exposure amount of the image sensor to be reset at a timing corresponding to the type of driving of the shutter for each camera in a case where there is variation or change in the type of driving due to individual unit differences or changes over time in the shutter mechanism.

7 Claims, 4 Drawing Sheets

DIGITAL CAMERA AND EXPOSURE CONTROL METHOD

CROSS REFERENCES TO RELATED APPLICATIONS

The entire disclosure of Japanese Patent Application No. 2011-048739, filed Mar. 7, 2011 is incorporated by reference herein. The entire disclosure of Japanese Patent Application No. 2011-051445, filed Mar. 9, 2011 is incorporated by reference herein.

BACKGROUND

1. Technical Field

The present invention relates to a digital camera and an exposure control method thereof.

2. Related Art

In the past, as an imaging device which is able to be applied to a digital camera such as this, there has been proposed providing an imaging element which stores light which has been received as charge and a focal plane type shutter which is driven so as to shade the imaging element and adjustment of the exposure time by controlling the start time of charge storage scanning of the imaging element which is equivalent to driving of a prior curtain and the start time of shutter driving which is equivalent to the driving of a latter curtain when imaging a still image (for example, Japanese Patent No. 3988215 (JP-A-11-41523)).

In addition, as an electronic camera which performs exposure control by using an electronic shutter and a mechanical shutter in combination, there is proposed performing adjustment of deviation in exposure time which is generated by individual unit differences in the mechanical lag from instruction of a closing operation of the mechanical shutter to the actual starting of the closing operation using back and forth adjustment of a charge storage start timing and a shutter driving start timing of the electronic shutter while performing evaluation of the amount of exposure light using an integrated value of a signal which is equivalent to brightness data of one screen (for example, JP-A-11-234574).

However, in the latter camera described above, since it is necessary to perform adjustment of the exposure time which is generated by individual unit differences of the mechanical shutter for each individual unit, a certain amount of time and equipment are necessary for adjustment since it is necessary to image a light source which is determined in a certain environment. In addition, there are cases where easy adjustment of the exposure time by a user is not possible and an appropriate imaging image is not able to be obtained when there are changes over time in the mechanical shutter.

SUMMARY

An advantage of some aspects of the invention is that a digital camera and an exposure control method thereof set time when an image sensor is exposed more appropriately.

The digital camera and the exposure control method thereof adopt the following means for achieving the advantages described above.

A digital camera according to an aspect of the invention is provided with an image sensor which generates an image signal based on an exposure amount, a shutter which blocks light which hits the image sensor by moving in a predetermined direction, a movement control section which moves the shutter so that light which hits the image sensor which has been hit by the light is blocked, a movement detection section which detects that the shutter has moved a predetermined amount from the start of the movement before the start of the shutter blocking the light which hits the image sensor, and a reset control section which starts reset scanning of the exposure amount of the image sensor in the predetermined direction at a timing according to a necessary detection time from the start of the movement of the shutter to the detection by the movement detection section before the start of the shutter blocking the light which hits the image sensor.

According to the digital camera of the invention, the shutter which blocks the light which hits the image sensor moves so as to shade the light which hits the image sensor which has been hit by the light. Then, that the shutter has moved a predetermined amount from the start of the movement is detected before the start of the shutter blocking the light which hits the image sensor, and furthermore, the reset scanning of the exposure amount of the image sensor in the predetermined direction is started at a timing according to the necessary detection time from the start of the movement of the shutter to the detection of the predetermined amount of movement before the start of the shutter blocking the light which hits the image sensor. That is, the reset scanning of the exposure amount of the image sensor is started as a prior curtain action at a timing according to the necessary detection time from the start of the movement of the shutter as a latter curtain action. In this manner, from the start of the reset scanning of the exposure amount of the image sensor at a timing according to the time from the start of the movement of the shutter to the detection of the predetermined amount of movement, it is possible for the exposure amount of the image sensor to be reset at a timing corresponding to the type of movement of the shutter for each camera in a case where there is variation in the type of movement due to individual unit differences in the mechanism which includes the shutter or in a case where the type of movement has changed due to changes over time in the mechanism which includes the shutter. As a result, it is possible to set the time when the image sensor is exposed more appropriately. Here, the reset scanning in the predetermined direction is where the resetting of the exposure amount of the image sensor is performed in order in the predetermined direction, and in the resetting of the exposure amount, performing of the resetting of the exposure amount in a state where the resetting of the exposure amount has not been performed and terminating of the resetting of the exposure amount in a state where the resetting of the exposure amount is being performed continuously are included, and in addition, performing of the resetting as a result of a read out process and the like and terminating of the resetting as a result of the termination of the read out process and the like are included. Here, in a case where only a partial region (referred to as an effective pixel region) of an image sensor circuit is effective, the meaning of the image sensor here is an image sensor circuit with an effective pixel region.

According to the digital camera of the invention, it is possible for the reset control section to start the reset scanning of the exposure amount of the image sensor in the predetermined direction at a timing according to the necessary detection time so that the image sensor is exposed over the exposure time in a case where the exposure time where the image sensor is to be exposed is shorter than a time threshold which is determined in advance and to start the reset scanning of the exposure amount of the image sensor in the predetermined direction with no relation to the necessary detection time so that the image sensor is exposed over the exposure time in a case where the exposure time is longer than the time threshold. In the case where the exposure time is comparatively long, there are cases where the exposure time is not able to be guaranteed when the reset scanning of the exposure amount of the image sensor is started as the prior curtain action at a timing according to the necessary detection time from the start of the movement of the shutter as the latter curtain action. In addition, in the case where the exposure time is comparatively long, there is a relatively small effect which is applied to the actual exposure time by the individual unit differences and the changes over time of the mechanism which includes the shutter. As a result, it is possible to set the time when the image sensor is exposed more appropriately by starting the reset scanning of the exposure amount of the image sensor in the predetermined direction with no relation to the necessary detection time so that the image sensor is exposed over the exposure time in a case where the exposure time is longer than the time threshold. In this case, it is possible for the time threshold to be a time which is determined in advance to be within the time which is necessary for the movement of the shutter from the predetermined amount of movement after the start of the movement of the shutter to the start of the blocking of the light which hits the image sensor. In addition, in this case, the reset control section may start the reset scanning of the exposure amount of the image sensor in the predetermined direction at a timing according to the necessary detection time so that the image sensor is exposed over the exposure time in a case where the exposure time and the time threshold are the same or may start the reset scanning of the exposure amount of the image sensor in the predetermined direction with no relation to the necessary detection time so that the image sensor is exposed over the exposure time.

According to the digital camera of the invention where the reset scanning of the exposure amount of the image sensor is started according to whether or not the exposure time is equal to or less than the time threshold, the reset control section may start the reset scanning of the exposure amount of the image sensor in the predetermined direction at a timing which is earlier in a case where the exposure time is longer than a predetermined exposure time compared to a case where the exposure time is shorter than the predetermined exposure time and which is later in a case where the necessary detection time is longer than the predetermined exposure time compared to a case where the necessary detection time is shorter than the predetermined exposure time in a case where the exposure time is shorter than the time threshold. In other words, the reset scanning of the exposure amount of the image sensor in the predetermined direction may be started at a timing which tends to be earlier the longer the exposure time (for example, where the comparative tendency or stepped form (in a stepped manner) is earlier when the exposure time is longer) and with a tendency to be later as the necessary detection time is longer (for example, where the comparative tendency or stepped form (in a stepped manner) is later when the necessary detection time is longer) in a case where the exposure time is shorter than the time threshold. In this case, it is possible for the reset control section to start the reset scanning of the exposure amount of the image sensor in the predetermined direction at a reset timing which is set along with the movement start timing where the movement of the shutter is to be started by the movement control section so that the image sensor is exposed over the exposure time in a case where the exposure time is longer than the time threshold.

In addition, according to the digital camera of the invention where the reset scanning of the exposure amount of the image sensor is started according to whether or not the exposure time is equal to or less than the time threshold, it is possible for the reset control section to start the reset scanning of the exposure amount of the image sensor in the predetermined direction at a timing according to detection by the movement detection section after the start of the movement of the shutter and the previous detection by the movement detection section after the start of the movement of the shutter in a case where the exposure time is shorter than the time threshold and to start the reset scanning of the exposure amount of the image sensor in the predetermined direction at a timing not according to detection by the movement detection section after the start of the movement of the shutter in a case where the exposure time is longer than the time threshold and according to the previous detection by the movement detection section after the start of the movement of the shutter.

In addition, according to the digital camera of the invention, it is possible for the movement detection section to detect a detection position, which is between an edge portion on the image sensor side in an open state of the shutter and an edge portion of the image sensor on the shutter side, being reached by the movement of the shutter in a case of imaging in the optical axial direction.

Alternatively, according to the digital camera of the invention, it is possible for the movement detection section to detect the movement of the shutter by detecting an action of a connection member which is connected to the movement of the shutter.

An exposure method of a digital camera, which is provided with an image sensor which generates an image signal based on an exposure amount and a shutter which blocks light which hits the image sensor by moving in a predetermined direction, according to another aspect of the invention includes (a) moving the shutter so that light which hits the image sensor which has been hit by the light is blocked, (b) detecting that the shutter has moved a predetermined amount from the start of the movement before the start of the shutter blocking the light which hits the image sensor, and (c) starting reset scanning of the exposure amount of the image sensor in the predetermined direction at a timing according to a necessary detection time from the start of the movement of the shutter to the detection in (b) before the start of the shutter blocking the light which hits the image sensor.

According to the exposure control method of a digital camera of the invention, the reset scanning of the exposure amount of the image sensor is started as a prior curtain action at a timing according to the necessary detection time from the start of the movement of the shutter as a latter curtain action. In this manner, from the start of the reset scanning of the exposure amount of the image sensor at a timing according to the time from the start of the movement of the shutter to the detection of the predetermined amount of movement, it is possible for the exposure amount of the image sensor to be reset at a timing corresponding to the type of movement of the shutter for each camera in a case where there is variation in the type of movement due to individual unit differences in the mechanism which includes the shutter or in a case where the type of movement has changed due to changes over time in the mechanism which includes the shutter. As a result, it is possible to set the time when the image sensor is exposed more appropriately. Here, the reset scanning in the predetermined direction is where the resetting of the exposure amount of the image sensor is performed in order in the predetermined direction, and in the resetting of the exposure amount, performing of the resetting of the exposure amount in a state where the resetting of the exposure amount has not been performed and terminating of the resetting of the exposure amount in a state where the resetting of the exposure amount is being performed continuously are included. Here, according to the exposure control method of a digital camera of the invention, various formats of the digital camera described above may be adopted or the realization of each function of the digital camera described above may be added. In addition, the invention may be established as a computer program or a program recording medium which realizes the functions described above in a camera. Naturally, the recording medium of the computer program may be a magnetic recording medium, an optical magnetic recording medium, or any recording media which are developed in the future.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
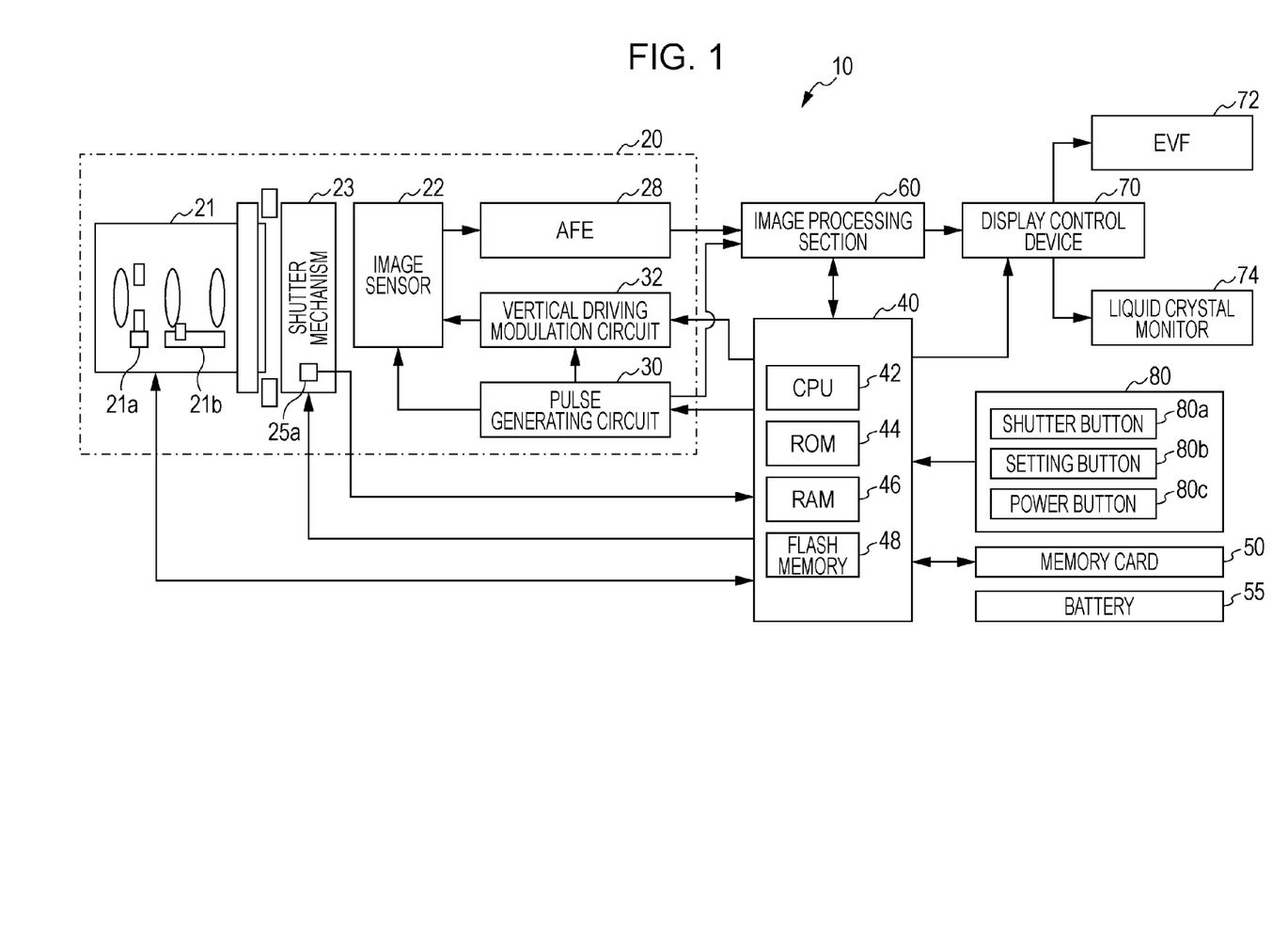
FIG. 1 is a configuration diagram illustrating an outline of a configuration of a digital camera which is an embodiment of the invention.
Figure 2:
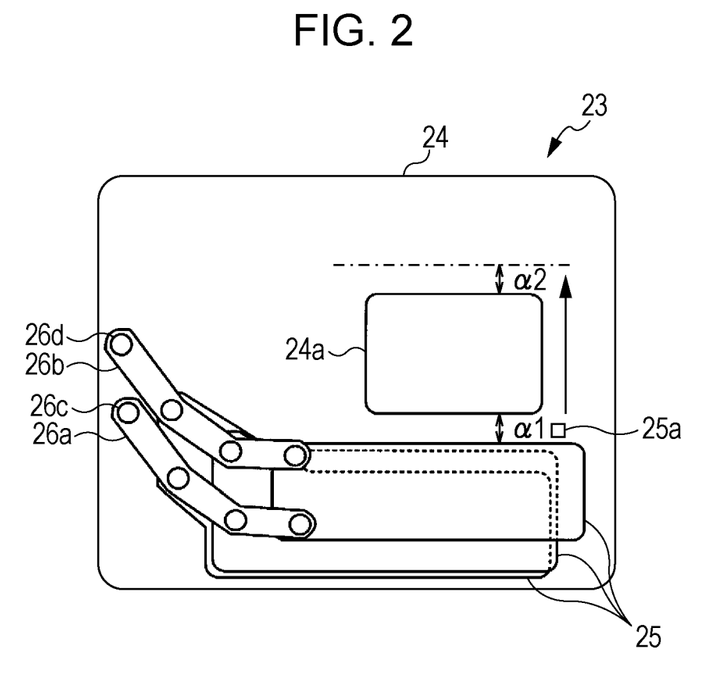
FIG. 2 is an explanatory diagram describing an appearance of a shutter mechanism when viewed from a light incidence direction.
Figure 3:
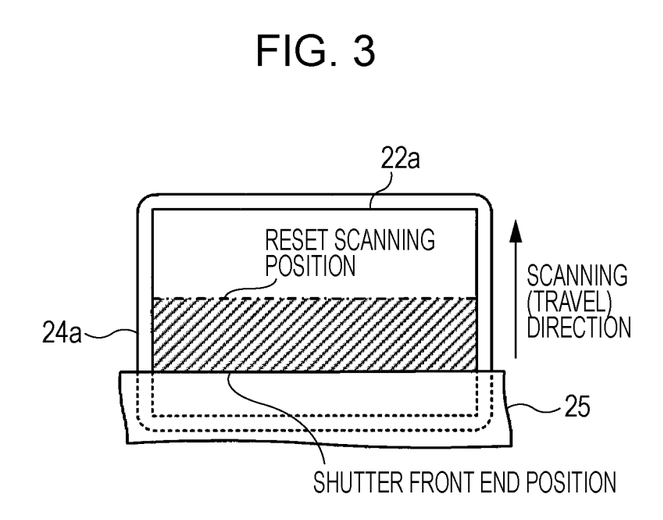
FIG. 3 is an explanatory diagram describing an appearance of an image sensor being exposed.

Next, embodiments of the invention will be described using diagrams. FIG. 1 is a configuration diagram illustrating an outline of a configuration of a digital camera 10 which is an embodiment of the invention. FIG. 2 is an explanatory diagram describing an appearance of a shutter mechanism 23 when viewed from a light incidence direction. FIG. 3 is an explanatory diagram describing an appearance of an image sensor 22 being exposed.

The digital camera 10 according to the embodiment is provided with an electronic imaging unit 20 which outputs a signal for an imaging image based on an image signal which is generated by photoelectric conversion of an image of an object, an image processing device 60 which generates image data and an image file of the imaging image by inputting the signal which is output from the electronic imaging unit 20 and carrying out predetermined image processing, a display control device 70 which displays the image data which is input from the image processing device 60 on an EVF (Electronic View Finder) 72 or a liquid crystal monitor 74, a various operation buttons grouping 80 which is operated by a user, a memory card 50 which is able to store the image file which is generated by the image processing device 60, a battery 55 which supplies electrical power to each section of the digital camera 10, and a main controller 40 which controls the overall device.

The electronic imaging unit 20 is provided with an imaging lens 21 which is attached so as to be able to be replaced via a lens mount which is not shown in the main body of the digital camera 10, the image sensor 22 which converts the light which is input via the imaging lens 21 into an electric signal by photoelectric conversion, the shutter mechanism 23 which is disposed between the imaging lens 21 and the image sensor 22, an analog front end (AFE) 28 which converts the electrical signal which is output from the image sensor 22 to a digital signal and outputs the digital signal, and a pulse generation circuit 30 which outputs a clock signal to the image sensor 22 and the image processing device 60.

The imaging lens 21 is provided with an aperture mechanism 21a which adjusts the amount of light which is incident on the image sensor 22 and an autofocus mechanism 21b which performs focusing based on information from a distance measuring sensor which is not shown and the imaging lens 21 along with a plurality of lens groupings which are configured by combining concave lenses and convex lenses. The aperture mechanism 21a and the autofocus mechanism 21b are controlled by the motors of each mechanism being driven using signals from the main controller 40.

The image sensor 22 is configured as a CMOS image sensor which is provided with a plurality of photodiodes (not shown) which form an imaging surface 22a (refer to FIG. 3) which are disposed in a matrix formation and a plurality of amplifiers (not shown) which is provided for each of the photodiodes. The photodiodes are photoelectric conversion elements which store light during exposure by conversion into a charge and are provided for each pixel. The photodiodes are able to release the charge to a substrate which is not shown. The amplifiers amplify so that the charge which is stored in the photodiodes is able to be read out as a signal. In the image sensor 22, a signal of any of the colors of red (R), green (G), or blue (B) is output to the imaging surface 22a via the amplifiers from each of the photodiodes by using color filters. In each of the photodiodes of the image sensor 22, a horizontal scanning clock (horizontal scanning pulse) from the pulse generation circuit 30 is supplied along with a vertical scanning clock (vertical driving pulse), which is generated by the pulse generation circuit 30 and where the frequency is modulated using a vertical driving and modulation circuit 32, being supplied. In the embodiment, reset scanning of an exposure amount of the image sensor 22 which discharges the charge which is stored in the photodiodes and read-out scanning of the image signal from the image sensor 22 which is generated based on the exposure amount are executed along with adjustment of scanning speed by the supplying of the clock by the pulse generation circuit 30 and the modulation of the clock frequency by vertical driving and modulation being controlled by a signal from the main controller 40, and the reset scanning of the exposure amount of the image sensor 22 functions as an electronic prior curtain action.

The shutter mechanism 23 functions as a mechanical latter curtain with regard to the electronic prior curtain, and as shown in FIG. 2, is provided with a ground plate 24 which is supported by the main body of the digital camera 10 in the front of the optical axial direction of the image sensor 22 and where an opening 24a is formed with a rectangular shape, a plurality of shutter blades 25 with rectangular shapes, and a driving arm 26a and a driven arm 26b which are connected to one edge of each of the shutter blades 25 and configure a parallel linking mechanism with the shutter blades 25. The driving arm 26a and the driven arm 26b rotate centered on a shaft 26c and a shaft 26d at the edge portion which is connected to each of the shutter blades 25 and an edge portion on the opposite side. The driven arm 26b is connected to the driving arm 26a by a connection member which is not shown and rotates along with the driving arm 26a. The driving of the shutter blades 25 due to the rotation of the driving arm 26a is performed as will be described next. When the shutter blades 25 are in an open state (the state of FIG. 2), the driving arm 26a is first held in a state where rotation is not possible by passing of electricity through an electromagnet, and further, is set in a state where rotation is always possible if the passage of electricity through the electromagnet is removed by removing a fastening member due to driving of a motor which is not shown. Next, when the driving arm 26a starts to rotate due to the removal of the passage of electricity through the electromagnet, the shutter blades 25 are driven from vertically downward to upward (in the direction of the thick arrow in FIG. 2) in the digital camera 10 due to the pressing force of a spring which is not shown. When the shutter blades 25 are driven, input light from the opening 24a of the ground plate 24 to the image sensor 22 is blocked and creating a shading state. After this, when the driving arm 26a is rotated in the reverse direction due to the driving of the motor again, the shutter blades 25 return to the original position (the position of FIG. 2) and the driving arm 26a is not able to rotate due to the fastening of the fastening member by the driving of the motor again.

In the shutter mechanism 23, since the shutter blades 25 are driven so that a wider scope than the opening 24a of the ground plate 24 is blocked, a margin $\alpha 1$ is secured between the vertical upper edge of the shutter blades 25 (referred to below as the front edge) and the lower edge of the opening 24a in the open state of the shutter blades 25 as shown in FIG. 2. In addition, in the shading state due to the shutter blades 25, the front edge of the shutter blades 25 is positioned above the upper edge of the opening 24a by a margin $\alpha 2$. The digital camera 10 of the embodiment adopts a mirrorless configuration where there are no mirrors in the incidence path of the light to the image sensor 22, and when the shutter blades 25 are in an open state, there is a state where the light is able to be directly incident on the image sensor 22. Here, in FIG. 2, a position sensor 25a is attached so that a position which is between the front edge of the shutter blades 25 in an open state (the edge portion of the shutter blades 25 on the image sensor 22 side) and the lower edge of the imaging surface 22a of the image sensor 22 (the edge portion of the imaging surface 22a on the shutter blades 25 side) in the front of the optical axial direction of the ground plate 24 is a detection position, and before the front edge of the shutter blades 25 starts to shade at the lower edge of the imaging surface 22a, the front edge of the shutter blades 25 reaching the detection position by starting moving from the open state and being driven by a predetermined amount is detected. As the position sensor 25a, it is possible to use, for example, a non-contact sensor such as a proximity switch which uses an electric field or a magnetic field. The meaning of the predetermined amount will be described again.

Although not shown, the image processing device 60 is provided with various types of image processing functional blocks which execute existing image processing in the digital camera such as a color interpolation processing and white balance processing of RGB pixels, color reproduction processing, resizing processing, gamma correction processing, and image filter generation processing. The image processing device 60 inputs the digital signal which is output from the electronic imaging unit 20, inputs the clock signal from the pulse generation circuit 30, generates the imaging image by the execution of image processing, and generates the image file by converting the imaging image which has been generated to an image of a predetermined format and adding imaging information. In addition, the image processing device 60 generates an image for live preview display by sequentially inputting the digital signal which is output from the electronic imaging unit 20 for each predetermined amount of time.

The display control device 70 displays an imaging image which is generated by the image processing device 60 on the liquid crystal monitor 74 and performs a live preview display which is sequentially displays the images for view previewing which are generated by the image processing device 60 on the EVF 72 or the liquid crystal monitor 74.

The operation buttons grouping 80 is formed from a shutter button 80a for outputting an imaging instruction of the subject to the main controller 40 when pressed by the user, a plurality of setting buttons 80b for setting various setting values which are related to imaging such as shutter speed, an aperture value, an exposure value, and the like, a power button 80c which instructs the turning on or off of the power, and the like.

The main controller 40 is configured as a microprocessor which is centered on a CPU 42 and is provided with a ROM 44 which stores a processing program and various tables, a RAM 46 which temporarily stores data, a flash memory 48 which stores data even when the power is off where rewriting of the data is possible, and an input and output port which is not shown. In the main controller 40, a detection signal (on/off signal) from the position sensor 25a which detects that the shutter blades 25 have been driven the predetermined amount from the start of the movement, various operation signals from the operation buttons grouping 80, information of the imaging lens 21, an image file which is read out from the memory card 50, various images from the image processing section 60, and the like are input. In addition, from the main controller 40, a driving signal to the imaging lens 21, a control signal to the shutter mechanism 23 for controlling a motor which is not shown and controlling the passing of electricity through the electromagnet, a control signal to the pulse generation circuit 30, a control signal of vertical driving and demodulation, an image file which is written into the memory card 50, an image processing instruction to the image processing section 60, a display control instruction to the display control device 70, and the like are output.

In the digital camera 10 of the embodiment which is configured in this manner, when an imaging instruction is output according to an operation of the shutter button 80a by setting the various setting values such as the shutter speed, various controls for exposure such as the reset scanning of the exposure amount of the image sensor 22, the driving control of the shutter blades 25, and the read-out scanning of the image signal from the image sensor 22 are executed by the main controller 40 and the image file which is finally generated from the output signal of the electronic imaging unit 20 by the image processing device 60 is stored in the memory card 50. According to the various controls for exposure in the imaging surface 22a of the image sensor 22, as shown in FIG. 3, first, the electronic prior curtain is operated by a reset scanning position (line) being moved upward by the reset scanning of the image sensor 22, next, shading is performed using the mechanical latter curtain by a position which is equivalent to the front edge of the shutter blades 25 (referred to below as a shutter front edge position) being moved upward, and finally, a read-out scanning position (line) of the image sensor 22 is sequentially moved upward. Accordingly, when taking note of one point on the image sensor 22, the time from the start of exposure by the resetting scanning position which is equivalent to the rear edge of the electronic prior curtain passing by this point until there is shading by the shutter front edge position which is equivalent to the front edge of the mechanical latter curtain passing by this point is equivalent to the shutter speed (exposure time), and by adjusting this time, time where the object is irradiated to the imaging surface 22a of the image sensor 22 is controlled. At this time, a region (region with the diagonal lines in the diagram) between the reset scanning position and the shutter front edge position in the imaging surface 22a of the image sensor 22 is a charge storage region in the image sensor 22, but the region is a region with a slit shape when the exposure time is short. Here, the reset scanning of the exposure amount of the image sensor 22 vertically upward is the performing of resetting of the exposure amount of the image sensor 22 in order vertically upward, and in the embodiment, the resetting of the exposure amount may be the performing of instantaneous resetting of the exposure amount in a state where the resetting of the exposure amount has not been performed or may be the termination of the resetting of the exposure amount in the state where the resetting of the exposure amount is being performed continuously over time. In addition, the resetting of the exposure amount may be performed as the result of another process such as read-out scanning.

Figure 4:
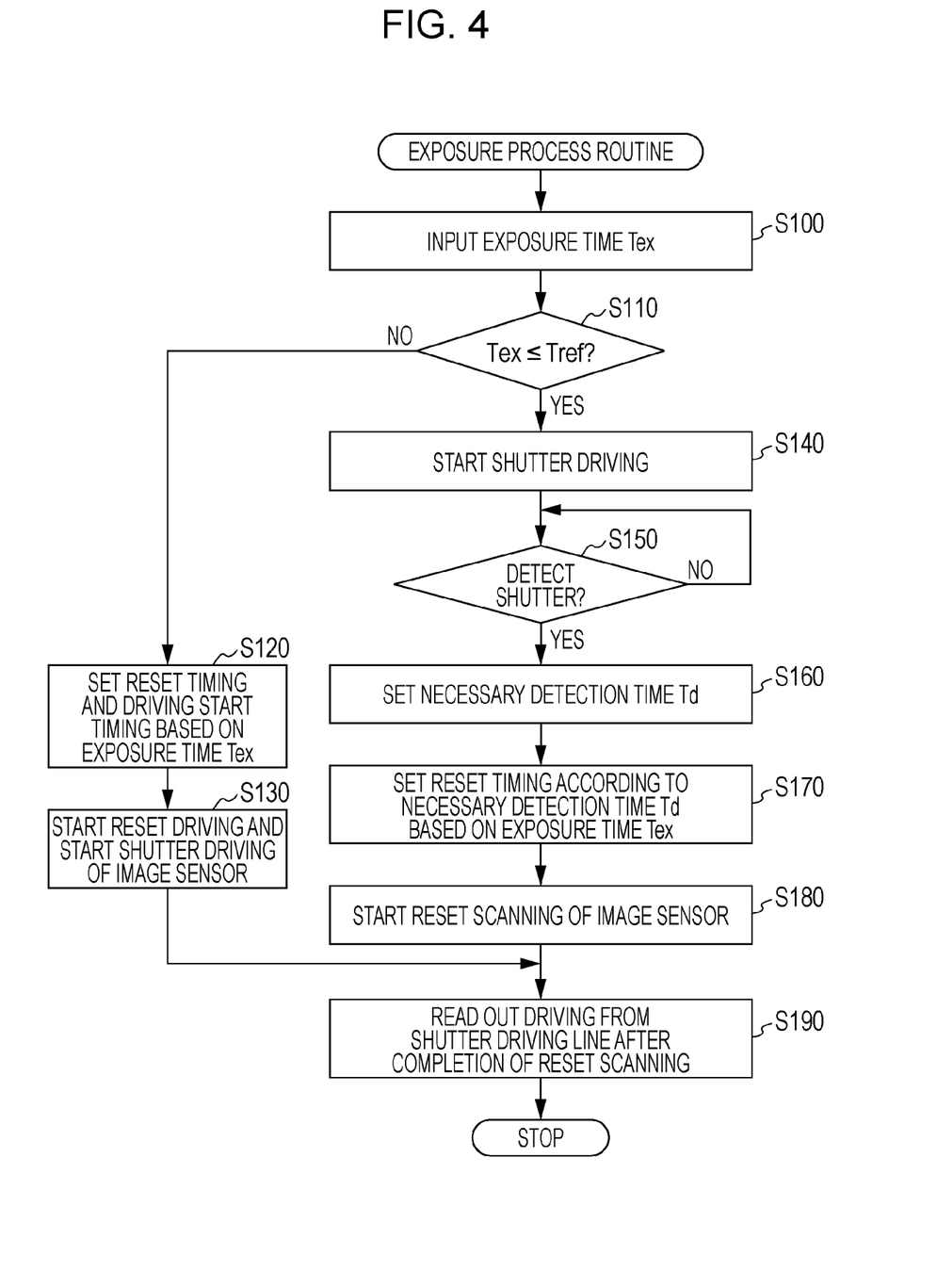
FIG. 4 is a flowchart illustrating one example of an exposure process routine.

Next, the action of the digital camera 10 of the embodiment which is configured in this manner, in particular, the action for exposure, will be described. FIG. 4 is a flowchart illustrating one example of an exposure process routine which is executed by the CPU 42 of the main controller 40. The routine is executed when the main controller 40 inputs an imaging instruction due to operation of the shutter button 80a. Here, before the main controller 40 inputs the imaging instruction, the various setting values which relate to exposure such as the shutter speed, the aperture value, the exposure value are set.

When the exposure process routine is executed, first, a process is executed where the CPU 42 of the main controller 40 inputs necessary data in the exposure process such as an exposure time Tex which has been set (step S100) and determines whether or not the exposure time Tex which has been input is longer than a time threshold Tref (step S110). Here, it is possible for the exposure time Tex to be input as the shutter speed as a setting due to operation of the setting button 80b by the user, a setting using an automatic exposure setting routine which is not shown, or the like. In addition, in the embodiment, the time threshold Tref is determined through experimentation or the like in advance a time which is necessary (shortest when considering individual unit differences and changes over time) for the driving of the shutter blades 25 from a timing where the shutter blades 25 are driven the predetermined amount from the start of movement to the detection position of the position sensor 25a until the start of the input light to the image sensor 22 being shaded and uses the setting as the shutter speed (exposure time) (for example, ¼000 of a second) which is determined in advance within a time which has been determined in this manner. Here, in a case where there is a plurality of shutter speeds (exposure time) in this manner, the longest (for example, ¼000 of a second out of ¼000 of a second and ⅛000 of a second) is used. The meaning of the time threshold Tref will be described again.

When it is determined that the exposure time Tex is longer than the time threshold Tref, it is determined that the exposure time Tex is not able to be secured when the reset scanning of the image sensor 22 is started after the driving of the shutter blades 25 (referred to below as shutter driving) has started and the reset timing of the reset scanning of the image sensor 22 and the driving start timing of the shutter blades 25 are set based on the exposure time Tex (step S120). Here, in the embodiment, the reset timing is set as a time for each vertical direction position (for each line) of the imaging surface 22a from the input of the imaging instruction and the driving start timing is set as a time from the input of the imaging instruction. In the embodiment, the reset timing and the driving start timing set the relationship between the exposure time Tex and the reset timing and the driving start timing from which the exposure time Tex is able to be obtained through experimentation or analysis in advance, are stored in the ROM 44 as a map for setting the timings, and are set by deriving the reset timing and the driving start timing which correspond from the map which is stored when the exposure time Tex is given.

Figure 5:
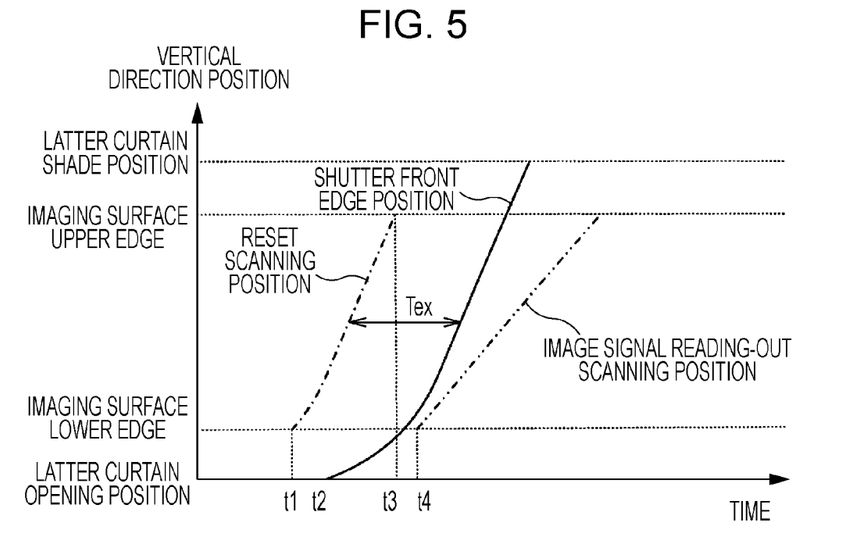
FIG. 5 is an explanatory diagram illustrating an appearance of when shutter driving is started after the start of reset scanning.

When the reset timing of the reset scanning of the image sensor 22 and the driving start timing of the shutter blades 25 are set in this manner, the reset scanning of the exposure amount of the image sensor 22 is started due to the reset timing which has been set and shutter driving is started at the driving start timing which has been set (step S130) and the exposure processing routine is terminated. The reset scanning is performed by outputting the respective control signals of the pulse generation circuit 30 and the vertical driving modulation circuit 32. The start of the shutter driving is performed due to the outputting of a control signal which instructs the start of driving to the shutter mechanism 23. FIG. 5 illustrates an appearance of when the shutter driving is started after the start of the reset scanning in a case where the exposure time Tex is longer than the time threshold Tref. In the diagram, the horizontal axis indicates time and the vertical axis indicates the vertical direction position. On the vertical axis, the shutter front edge position in an open state (latter curtain open position), the lower edge of the imaging surface 22a, the upper edge of the imaging surface 22a, and the shutter front edge position in a shielded state (latter curtain shielded position) are shown from bottom to top. As shown in the diagram, when the reset scanning starts at a timing t1 (refer to one-dot chain line) and the shutter driving start is instructed at a timing t2 after that (refer to solid line), the reset scanning is executed according to the reset timing which is set so that the exposure time Tex is exactly secured with regard to the trajectory of the shutter front edge position at a time when the shutter front edge position moves from the lower edge to the upper edge of the imaging surface 22a. Then, when the reset scanning of all of the lines is terminated at a timing t3, the read-out scanning of the image sensor 22 is started (refer to two-dot chain line) in order from the line where the shutter driving has been terminated at a timing t4 after that.

When the read-out scanning is terminated with regard to all of the lines by read-out scanning being performed from the lines where shutter driving has been terminated (step S190), the exposure processing routine is terminated. When the exposure processing routine is terminated, the image file of the imaging image is finally stored in the memory card 50 by digital conversion of a signal which is read out from the image sensor 22 using the AFE 28 and carrying out predetermined image processing using the image processing device 60. Due to the processing in this manner, it is possible to perform exposure of the image sensor 22 using the exposure time Tex which has been set in a case where the exposure time Tex is longer than the time threshold Tref.

When it is determined that the exposure time Tex is equal to or less than the time threshold Tref in step S110, first, the shutter driving is started (step S140) and awaits the input of a detection signal as an on signal from the position sensor 25a (step S150), and when the detection signal is input as an on signal from the position sensor 25a, a necessary detection time Td is set as the elapsed time from the instruction of the shutter driving start using time which is measured by a timer which is not shown (step S160). Here, in the embodiment, the predetermined amount with regard to the movement of the shutter blades 25 which is a detection target of the position sensor 25a uses a setting through experimentation or the like in advance as an amount of movement which is necessary to grasp the trend of changes such as lag or progression in the driving of the shutter blades 25 which is caused due to individual unit differences or change over time in the shutter mechanism 23.

Next, the reset timing of the image sensor 22 is set according to the necessary detection time Td based on the exposure time Tex (step S170). In the embodiment, the setting sets the relationship between the exposure time Tex, the necessary detection time Td, and the reset timing from which the exposure time Tex is able to be obtained through experimentation or analysis in advance, is stored in the ROM 44 as a map for setting the timings, and is set by deriving the reset timing which corresponds from the map which is stored when the exposure time Tex and the necessary detection time Td are given. The map for setting the timings is set so that the reset timing is set to be earlier the longer the exposure time Tex is and is set to be later the longer the necessary detection time Td is (the detection timing is later).

Figure 6:
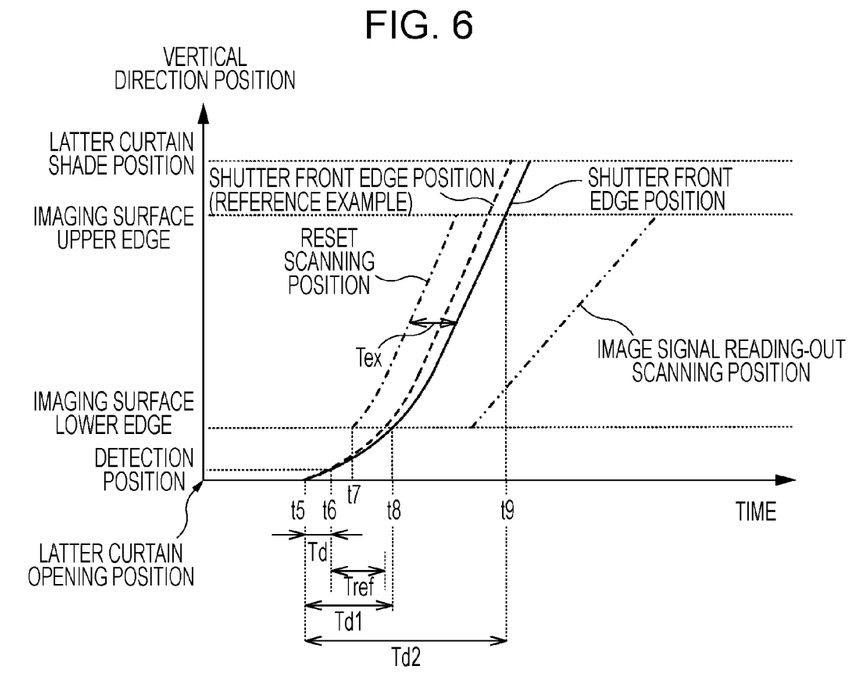
FIG. 6 is an explanatory diagram illustrating an appearance of when reset scanning is started after the start of shutter driving.

FIG. 6 illustrates an appearance of when the reset scanning is started after the start of the shutter driving in a case where the exposure time Tex is equal to or less than the time threshold Tref. In the diagram, with regard to the shutter front edge position, the solid line indicates a trajectory in a case where there is a lag in the driving due to individual unit differences or changes over time in the shutter mechanism 23 (for example, individual unit differences or changes over time in the electromagnet or the spring which are not shown) and the dashed line indicates a trajectory of a reference example in a case where there are no lags or progressions in the driving in an original state such as when the digital camera 10 is shipped. In addition, in the diagram, various timings and times are indicated in the case of the solid line, and for example, the shutter driving start is instructed at a timing t5 and the reset scanning is started at a timing t7 after that. As shown in the diagram, in the case where the exposure time Tex is equal to or less than the time threshold Tref, since the proportion taken up by the exposure time Tex which is the lag time or the progression time of the shutter driving due to individual unit differences or changes over time in the shutter mechanism 23, the effect that the individual unit differences or the changes over time in the shutter mechanism 23 has on the actual exposure time becomes large. As a result, not only is an earlier timing set as the reset timing with regard to the trajectory of the shutter front edge position as the exposure time Tex which has been set is longer, but it is adjusted so the detection timing of the shutter blades 25 at the detection position due to the position sensor 25a is later, that is, the reset timing is later as the necessary detection time Td is longer. In the diagram, as is understood by comparing the reference example which is shown by a dashed line and the case of the solid line, a time Td1 from the latter curtain open position at the timing t5 when the shutter driving starts until a timing t8 when the shutter front edge position reaches the detection position and a time Td2 from the latter curtain open position at the timing t5 until a timing t9 when the shutter front edge position reaches the upper edge of the imaging surface 22a have a trend of becoming longer as the necessary detection time Td from the timing t5 to the timing t6 is longer. In the embodiment, the exposure time is adjusted by taking the trend such as this as a deviation of the detection timing. It is possible to more reliably secure the exposure time Tex which is exact by the setting of the reset timing according to the necessary detection time Td using the position sensor 25a in this manner. Here, the setting of the reset timing to a timing which is later as the necessary detection time Td is longer is the setting of the reset timing to a timing which is earlier as the necessary detection time Td is shorter. In addition, as is understood from the one example of the time threshold Tref which is shown in the diagram, the exposure time Tex is not able to be secured even if the reset scanning is started after detection using the position sensor 25a in a case where the exposure time Tex is longer than the time threshold Tref. As such, it is possible that the time threshold Tref is for determining whether or not the reset scanning may be started after the detection timing using the position sensor 25a.

When the reset timing is set in this manner, the reset scanning is started using the reset timing which has been set (step S180), the read-out scanning is finally performed (step S190), and the exposure process routine is terminated.

Here, the corresponding relationship of the constituent elements of the embodiment and the constituent elements of the invention will be made clear. The image sensor 22 of the embodiment is equivalent to the "image sensor" of the invention, the shutter blades 25 are equivalent to the "shutter", the main controller 40 which executes the process of step S140 of the exposure process routine of FIG. 4 which controls the shutter mechanism 23 so as to start the driving of the shutter blades 25 is equivalent to the "movement control section", the position sensor 25a which detects that the shutter blades 25 has moved the predetermined amount from the start of movement and the main controller 40 which executes the process of step S150 of the exposure process routine of FIG. 4 which determines the detection signal from the position sensor 25a are equivalent to the "movement detection section", and the main controller 40 which executes the processes of steps S170 and S180 of the exposure process routine of FIG. 4 which starts the reset scanning by setting the reset timing according to the necessary detection time Td using the position sensor 25a is equivalent to the "reset control section". Here, one example of the exposure process method of the digital camera of the invention has been made clear through the description of the action of the digital camera in the embodiment.

In the digital camera 10 of the embodiment which has been described above, the shutter blades 25 are driven so that light which hits the image sensor 22 which has been hit by the light is blocked. Then, that the shutter blades 25 have moved the predetermined amount from the start of the movement is detected before the start of the shutter blades 25 blocking the light which hits the image sensor 22, and furthermore, the reset scanning of the exposure amount of the image sensor 22 vertically upward is started at the reset timing according to the necessary detection time Td from the start of the movement of the shutter blades 25 to the detection of the predetermined amount of movement before the start of the shutter blades 25 blocking the light which hits the image sensor 22. In this manner, from the start of the reset scanning of the exposure amount of the image sensor 22 at a timing according to the time from the start of the movement of the shutter blades 25 to the detection of the predetermined amount of movement, it is possible for the exposure amount of the image sensor 22 to be reset at a timing corresponding to the type of the shutter driving for each camera in a case where there is variation in the type of driving due to individual unit differences in the shutter mechanism 23 or in a case where the type of driving has changed due to changes over time in the shutter mechanism 23, and it is possible to set the time when the image sensor 22 is exposed more appropriately.

Here, the invention is not limited in any way to the embodiment described above, and needless to say, various embodiments are possible as long as they belong to the technical scope of the invention. For example, one or a plurality of the modifications below may be combined with the embodiment described above.

In the embodiment described above, the shutter speed (exposure time) which is determined in advance within the time which is necessary to drive the shutter blades 25 from the driving of the shutter blades 25 the predetermined amount to the detection position of the position sensor 25a after the start of movement until the start of the shutter blades 25 blocking the input light to the image sensor 22 is used as the time threshold Tref, but the time which is necessary for the driving of the shutter blades 25 may be used as it is or a time which is slightly shorter than the shutter speed (exposure time) which is determined in this manner may be used.

In the embodiment described above, in the case where the exposure time Tex is equal to or less than the time threshold Tref, the reset timing of the image sensor 22 is set to be a timing which is earlier as the exposure time Tex is longer and a timing which is later as the necessary detection time Td is longer, that is, is set as a timing with a comparative tendency to be earlier as the exposure time Tex is longer and a timing with a comparative tendency to be later as the necessary detection time Td is longer, but may be set to a timing which is earlier in a stepped form (in a stepped manner) as the exposure time Tex is longer or may be set to a timing which is later in a stepped form (in a stepped manner) as the necessary detection time Td is longer.

In the embodiment described above, the position sensor 25a which detects that the front edge of the shutter blades 25 has reached the detection position by starting moving from the open state and being driven upward the predetermined amount is used as the sensor which detects that the shutter blades 25 have moved the predetermined amount from the start of movement, but instead of this, another sensor may be used such as a sensor which detection the action of the connection member which is connected to the movement of the shutter. As the connection member, for example, there is the driving arm 26a, the driven arm 26b, the shaft 26c, the shaft 26d, and the spring which activates the driving arm 26a of the shutter mechanism 23. In addition, as the sensor, for example, a rotational position sensor or the like may be used which detects the rotational position of the driving arm 26a, the driven arm 26b, the shaft 26c, the shaft 26d or the like of the shutter mechanism 23 or a sensor may be used which detects the deforming of the spring or the like which activates the driving arm 26a. In addition, the position sensor is not limited to one and the control of the reset scanning may be performed based on the detection result using a plurality of the detection sensors. In this case, the necessary detection timing Td may be set not only based on the elapsed time from the instruction of the shutter driving start but also on the difference in the detection timing of each of the position sensors.

In addition, a position sensor may be provided also in a position at the movement termination side of the shutter blades 25 (a side above the lower edge of the imaging surface 22a) and the control of the reset scanning when imaging from the next time and beyond may reflect the detection result of the position sensor. For example, the reset scanning timing may be set with consideration of the exposure time Tex and the detection result of the sensor when the shutter is activated previously and without any consideration of the necessary detection time Td in the case where the exposure time Tex is longer than the time threshold Tref, and the reset scanning timing may be set with consideration of the exposure time Tex, the detection result of the sensor when the shutter is activated previously, and the necessary detection time Td in the case where the exposure time Tex is shorter than the time threshold Tref.

In the embodiment described above, there is so-called vertical driving where the shutter mechanism 23 drives the shutter blades 25 in the vertical direction, but there may be so-called horizontal driving where the shutter blades are driven in the horizontal direction if there is movement in a predetermined direction so that a wider range than the imaging surface 22a is blocked in front of the imaging surface 22a of the image sensor 22. In addition, another configuration of shutter may be used such as a shutter which is driven in a rotational direction. In this case, the type of position sensor and the attachment position may be appropriately selected according to the shutter configuration.

In the embodiment described above, it is described such that all of the photodiodes in the image sensor 22 are effective, but it is not necessary that all of the plurality of photodiodes are effective and a partial region of the photodiodes (referred to as an effective pixel region) may be effective. In this case, the photodiodes in a region which excludes the effective pixel region are covered so as to not be hit by light, the charge thereof is not read-out, or the charge or signal which is read out is ignored. Then, that the shutter blades 25 have moved the predetermined amount from the start of movement is detected before the start of the shutter blades 25 blocking the light which hits the effective pixel region of the image sensor 22, and furthermore, it is possible for the reset scanning of the exposure amount of the image sensor 22 vertically upward to be started at the reset timing according to the necessary detection time Td from the start of the movement of the shutter blades 25 to the detection of the predetermined amount of movement before the start of the shutter blades 25 blocking the light which hits the effective pixel region of the image sensor 22. Here, it is irrespective if the detection using the position sensor or the start of the reset scanning is not performed before the start of the shutter blades 25 blocking the light which hits the photodiodes in the region which excludes the effective pixel region.

In the embodiment described above, the invention has been described as being applied to the digital camera 10, but may be the exposure control method of a digital camera such as this.

What is claimed is:

1. A digital camera comprising:
    an image sensor which generates an image signal based on an exposure amount;
    a shutter which blocks light which hits the image sensor by moving in a predetermined direction;
    a movement control section which moves the shutter so that light which hits the image sensor is blocked;
    a movement detection section which detects that the shutter has moved a predetermined amount from the start of the movement after the start of the movement of the shutter and before the start of the shutter blocking the light which hits the image sensor;
    an exposure time section which receives an exposure time which is for the image sensor to be exposed; and
    a reset control section which starts reset scanning of the exposure amount of the image sensor in the predetermined direction at a timing according to detection by the movement detection section before the start of the shutter blocking the light which hits the image sensor in a case where the exposure time is shorter than a time threshold which is determined in advance and starts reset scanning of the exposure amount of the image sensor in the predetermined direction with no relation to detection, after the start of the movement of the shutter, by the movement detection section so that the image sensor is exposed during the exposure time in a case where the exposure time is longer than the time threshold which is determined in advance.

2. The digital camera according to claim 1,
    wherein the time threshold is a time which is determined in advance to be within the time which is necessary for the movement of the shutter from the predetermined amount of movement after the start of the movement of the shutter to the start of the blocking of the light which hits the image sensor.

3. The digital camera according to claim 1,
wherein, in a case where the exposure time is shorter than the time threshold, the reset control section starts the reset scanning of the exposure amount of the image sensor in the predetermined direction at a timing which is earlier in a case where the exposure time is longer than a predetermined exposure time compared to a case where the exposure time is shorter than the predetermined exposure time and which is later in a case where the necessary detection time is longer than a predetermined required time compared to a case where the necessary detection time is shorter than the predetermined required time.

4. The digital camera according to claim 1,
wherein the reset control section starts the reset scanning of the exposure amount of the image sensor in the predetermined direction at a timing according to detection by the movement detection section after the start of the movement of the shutter and the previous detection by the movement detection section after the start of the movement of the shutter in a case where the exposure time is shorter than the time threshold and starts the reset scanning of the exposure amount of the image sensor in the predetermined direction at a timing not according to detection by the movement detection section after the start of the movement of the shutter and according to the previous detection by the movement detection section after the start of the movement of the shutter in a case where the exposure time is longer than the time threshold.

5. The digital camera according to claim 1,
wherein the movement detection section detects a detection position, which is between an edge portion on the image sensor side in an open state of the shutter and an edge portion of the image sensor on the shutter side, being reached by the movement of the shutter in a case of imaging in the optical axial direction.

6. The digital camera according to claim 1,
wherein the movement detection section detects the movement of the shutter by detecting an action of a connection member which is connected to the movement of the shutter.

7. An exposure method of a digital camera, which is provided with an image sensor which generates an image signal based on an exposure amount and a shutter which blocks light which hits the image sensor by moving in a predetermined direction, comprising:
  (a) starting movement of the shutter so that light which hits the image sensor is blocked;
  (b) detecting that the shutter has moved a predetermined amount from the start of the movement after the start of the movement of the shutter and before the start of the shutter blocking the light which hits the image sensor;
  (c) receiving exposure time which is for the image sensor to be exposed;
  (d) starting reset scanning of the exposure amount of the image sensor in the predetermined direction at a timing according to the detection in (b) which is after the start of the movement of the shutter before the start of the shutter blocking the light which hits the image sensor in a case where the exposure time is shorter than a time threshold which is determined in advance; and
  (e) starting reset scanning of the exposure amount of the image sensor in the predetermined direction with no relation to detection, after the start of the movement of the shutter, in (b) so that the image sensor is exposed during the exposure time in a case where the exposure time is longer than the time threshold which is determined in advance.

* * * * *